US009129180B2

(12) United States Patent
Lazaridis et al.

(10) Patent No.: US 9,129,180 B2
(45) Date of Patent: Sep. 8, 2015

(54) COMBINATION PEN REFILL CARTRIDGE AND ACTIVE STYLUS

(75) Inventors: Mihal Lazaridis, Waterloo (CA); James Alexander Robinson, Elmira (CA); Amit Pal Singh, Waterloo (CA); Cornel Mercea, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 408 days.

(21) Appl. No.: 13/588,053

(22) Filed: Aug. 17, 2012

(65) Prior Publication Data
US 2014/0050516 A1 Feb. 20, 2014

(51) Int. Cl.
*B43K 29/00* (2006.01)
*G06K 9/22* (2006.01)
*B43K 7/02* (2006.01)
*B43K 7/06* (2006.01)
*B43K 29/08* (2006.01)
*G06F 3/0354* (2013.01)
*B43K 29/18* (2006.01)

(52) U.S. Cl.
CPC . *G06K 9/222* (2013.01); *B43K 7/02* (2013.01); *B43K 7/06* (2013.01); *B43K 29/08* (2013.01); *G06F 3/0354* (2013.01); *B43K 29/00* (2013.01); *B43K 29/004* (2013.01); *B43K 29/18* (2013.01)

(58) Field of Classification Search
CPC .................................. G06K 9/222; G06K 9/24
USPC ..................................... 401/195, 99; 345/179
See application file for complete search history.

(56) References Cited

U.S. PATENT DOCUMENTS

| 6,227,743 | B1 | 5/2001 | Robb |
| 6,310,615 | B1 | 10/2001 | Davis et al. |
| 6,450,721 | B1 | 9/2002 | D'Amico et al. |
| 6,577,299 | B1 * | 6/2003 | Schiller et al. ............. 345/179 |
| 6,659,673 | B1 | 12/2003 | Haffner et al. |

(Continued)

FOREIGN PATENT DOCUMENTS

| CN | 1599894 | 3/2005 |
| DE | 102 08 939 | 9/2003 |

(Continued)

OTHER PUBLICATIONS

European Search Report, EP12180913.1, Nov. 30, 2012.
"Electric pen with retractable tip", IBM Technical Disclosure Bulletin, International Business Machines Corp., vol. 29, No. 7, Jul. 1, 1996, pp. 19-20.

*Primary Examiner* — Jennifer C Chiang
(74) *Attorney, Agent, or Firm* — Thomas Grzesik; Fleit Gibbons Gutman Bongini & Bianco P.L.

(57) ABSTRACT

A dual mode apparatus for writing on paper, inputting information to a host electronic device, and/or controlling applications on a host electronic device. The apparatus is preferably constructed and arranged as a combination pen and active stylus that includes a pen refill cartridge and an active stylus module. The pen refill cartridge comprises a body configured for storing ink and a ball-point assembly for dispensing the ink on a writing surface or physical media. The active stylus module is configured to transmit signals to the ball-point assembly of the pen refill cartridge. The ball-point assembly may include an antenna, optical transducer or ultrasonic transducer. In one expedient, the signals may be radio signals characterizing a force applied to the ball-point assembly, the level of a battery or the level of ink in the pen refill cartridge.

22 Claims, 6 Drawing Sheets

(56) References Cited

U.S. PATENT DOCUMENTS

| | | |
|---|---|---|
| 6,749,354 B2 | 6/2004 | Kageyama et al. |
| 6,830,404 B2 | 12/2004 | Nagaoka |
| 6,933,933 B2 | 8/2005 | Fleming |
| 7,018,124 B1 | 3/2006 | Kageyama et al. |
| 8,360,669 B2 * | 1/2013 | Underwood et al. ......... 401/195 |
| 2002/0060665 A1 | 5/2002 | Sekiguchi et al. |
| 2002/0192009 A1 * | 12/2002 | Tuli ............................... 401/195 |
| 2003/0063045 A1 | 4/2003 | Fleming |
| 2005/0073508 A1 | 4/2005 | Pittel et al. |
| 2007/0126716 A1 * | 6/2007 | Haverly ......................... 345/179 |
| 2011/0084846 A1 | 4/2011 | Li et al. |
| 2011/0164000 A1 * | 7/2011 | Pance ............................. 345/179 |

FOREIGN PATENT DOCUMENTS

| | | |
|---|---|---|
| EP | 2 458 477 | 5/2012 |
| JP | 4 118299 | 4/1992 |
| WO | WO0131570 | 5/2001 |

* cited by examiner

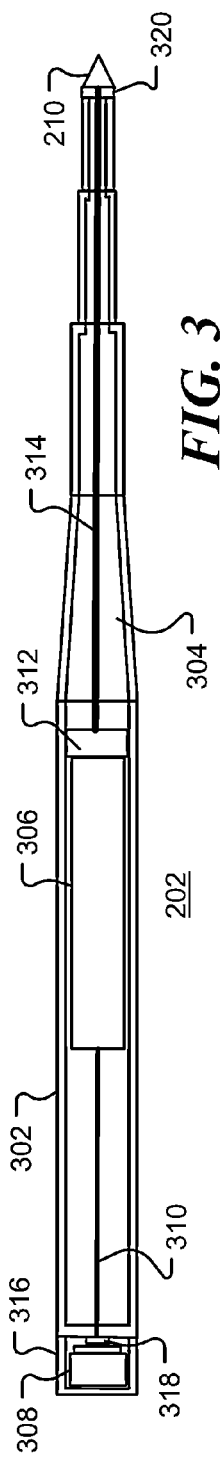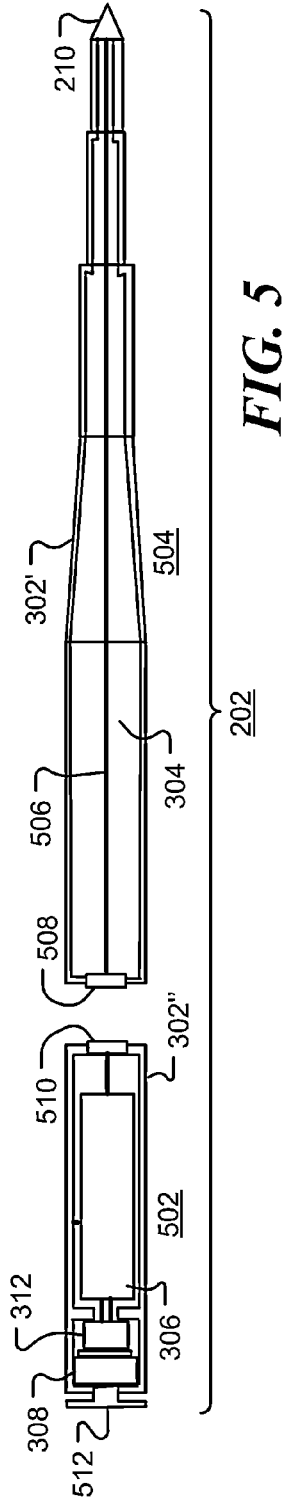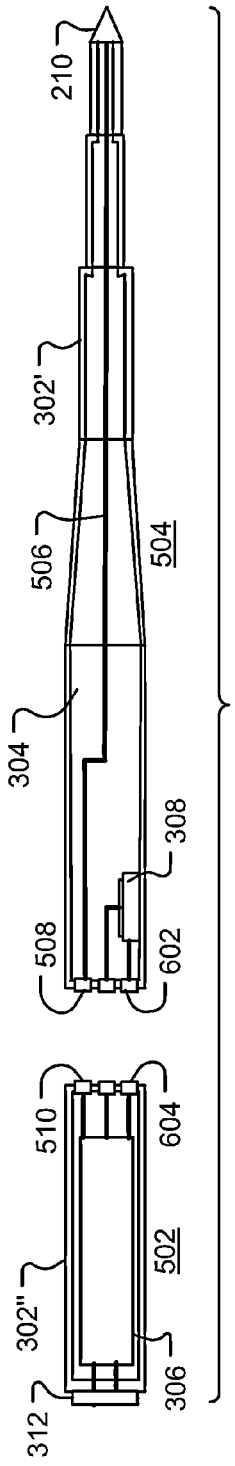

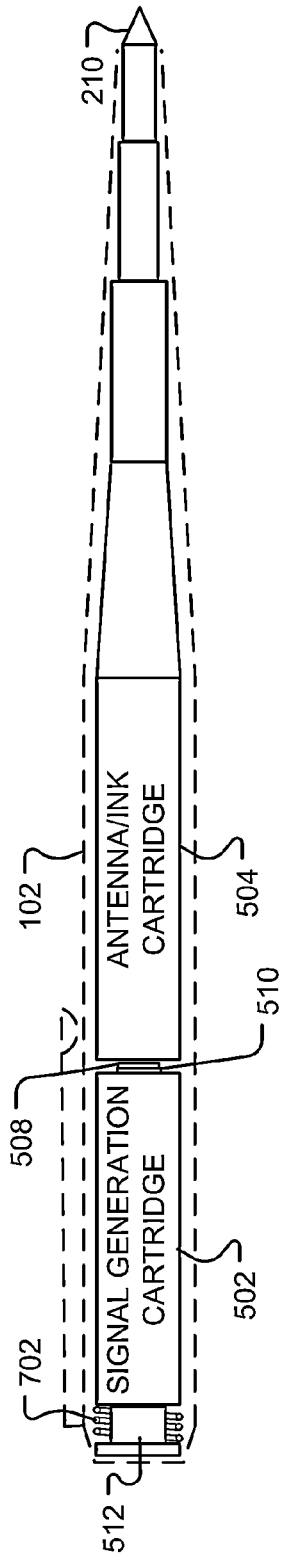
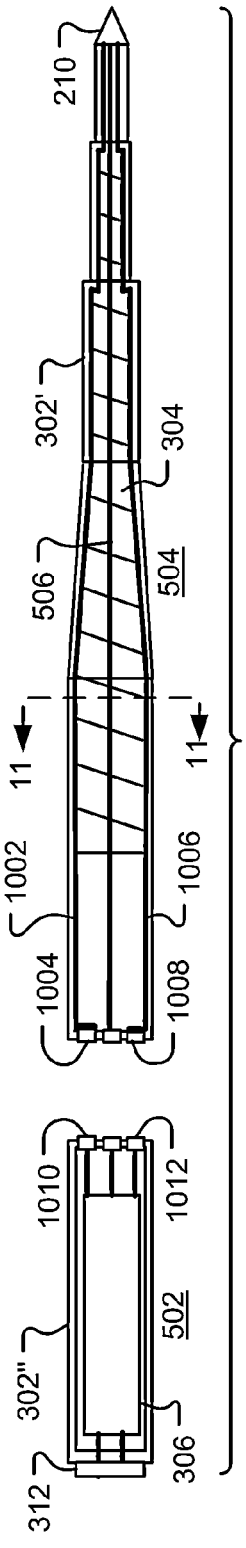
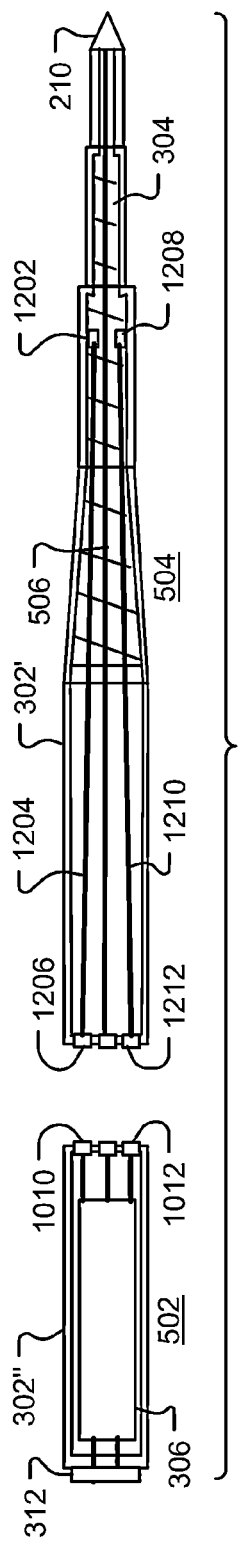

COMBINATION PEN REFILL CARTRIDGE AND ACTIVE STYLUS

BACKGROUND

Stylus pointing devices are utilized to input information and/or to control applications executing on a host electronic device. A stylus may be characterized as active or passive. An active stylus emits signals that are detected by the host device and processed to control an application. A passive stylus modifies an electrical property, such as the capacitance or resistance of a display surface or assembly of the host device. When the stylus tip is brought into close proximity to the display, the position thereof can be determined in several ways, such as, for example by: the effect of the stylus on the electrical properties of the display (i.e., by sensing electromagnetic induction, changes in electrical resistance, variance in electrical capacitance, and the like); changes in the optical properties of the tablet; processing ultrasonic/optical signals, etc.

In the instance of an active stylus that emits radio signals, a radio transmitter associated with the stylus generates and radiates an electromagnetic field that is sensed and processed by the host to yield a stylus position.

Since conventional writing implements cannot be used with an electronic host device, a user must have both a pen and stylus when writing and using an electronic device. It would therefore be desirable to provide a dual-mode stylus and pen that can be employed in both environments, thereby eliminating the need to carry both.

BRIEF DESCRIPTION OF THE DRAWINGS

Exemplary embodiments of the disclosure will be described below with reference to the included drawings such that like reference numerals refer to like elements and in which:

FIG. 3 is a schematic diagram of an exemplary active refill cartridge in accordance with an aspect of the disclosure;

FIG. 5 is a sectional view of an exemplary pen active refill cartridge in accordance with an aspect of the disclosure;

FIG. 6 is a sectional view of a further exemplary pen active refill cartridge;

FIG. 7 is a schematic view of an active refill cartridge;

FIG. 10 is a sectional view of a two-part active pen refill cartridge with an ink level sensor in accordance with an aspect of the disclosure;

FIG. 12 is a schematic diagram of a pen refill cartridge including an ink level sensor in accordance with an aspect of the disclosure.

DETAILED DESCRIPTION

Figure 1:
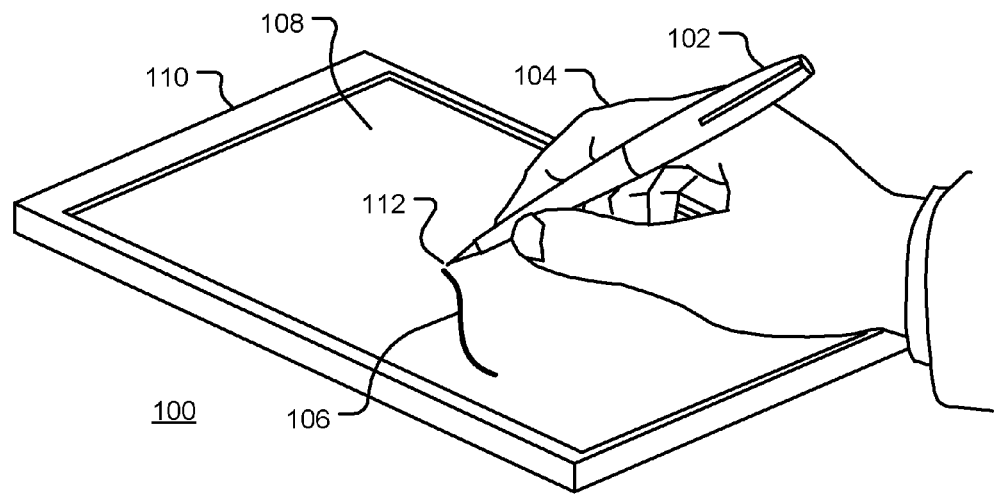
FIG. 1 is a schematic diagram of an exemplary drawing system, in accordance with aspects of the disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

In accordance with an aspect of the disclosure a writing implement is provided that enables a user to write on paper and provide inputs to a host electronic device. The writing implement is a combination pen and active stylus that includes a pen refill cartridge and an active stylus module comprising at least one element for generating signals that are sensed and processed by the host device. The pen refill cartridge comprises a hollow body configured to store ink and a ball-point assembly configured to receive the ink from the body. The active stylus module is configured to electrically couple to the ball-point assembly of the pen refill cartridge and operable to transmit signals to the ball-point assembly. In an illustrative embodiment, the signals are radio signals, and the active stylus module electrically communicates with the ball-point assembly of the pen refill cartridge via an electrically insulated conductor, such that the radio signals are radiated from the tip of the writing implement. In other embodiments, the ball-point assembly includes a light emitting diode, configured to generate an optical signal, or an ultrasonic transducer, operable to generate ultrasonic signals that may be sensed by the host device.

FIG. 1 is a schematic diagram of an exemplary drawing system 100 in accordance with an aspect of the disclosure. In FIG. 1, a writing implement 102 is manipulated by a user 104 to draw a line or other image 106 on display screen 108 of host electronic device 110. The display screen 108 is responsive to a signal transmitted from a tip 112 of the combination pen and active stylus 102. In one embodiment, the host electronic device includes a radio frequency sensor grid. Other embodiments may utilize infra-red, optical or ultrasonic sensors, for example. The display screen 108 may also include a capacitive or resistive touch screen, for example. Host electronic device 110 may be, for example, a laptop computer, tablet computer (tablet), mobile telephone, smart-phone, personal digital assistant (PDA), or other portable or non-portable electronic device.

In operation, display screen 108 of the host electronic device 110 senses one or more touch positions at which the combination pen and active stylus 102 touches, or is brought into close proximity with, the display screen 108.

Figure 2:
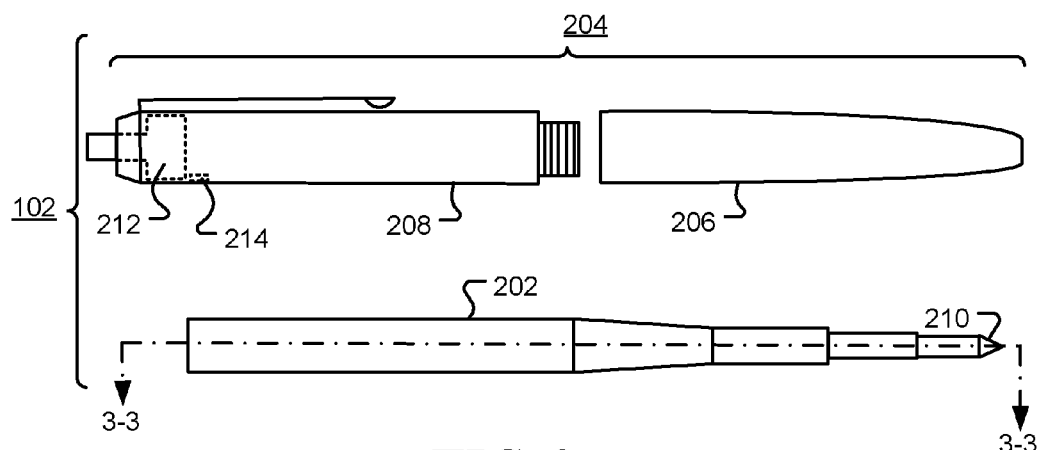
FIG. 2 is a schematic diagram of an illustrative combination ball-point pen and active stylus, in accordance with an aspect of the disclosure.

FIG. 2 is a schematic diagram of a combination ball-point pen and active stylus, in accordance with exemplary embodiments of the disclosure. The combination ball-point pen and active stylus 102 includes active refill cartridge 202 and pen housing 204. In operation, active refill cartridge 202 is placed inside pen housing 204 and the lower pen housing 206 and upper pen housing 208 are screwed together. Once assembled, ball-point assembly 210 of the cartridge 202 protrudes from an aperture in the end of the lower pen housing 206. In accordance with one aspect of the disclosure, the combination ball-point pen and active stylus 102 enables writing on paper or on a display of an electronic device. When the combination ball-point pen and active stylus 102 is moved across paper, friction between the paper and a ball of the ball-point assembly 210 causes the ball to rotate and transfer ink from the cartridge 202 to the paper. However, the viscosity of the ink within the cartridge is selected such that when the combination ball-point pen and active stylus 102 is moved across a display surface of a tablet, smart-phone, or other electronic device, there is insufficient friction to overcome the surface tension of the ink and no ink is transferred to the display surface. Instead, a stylus signal is transmitted from the ball-point assembly 210. In one embodiment, the ball-point assembly 210 operates as a radio antenna to enable communication with a host electronic device. The pen housing 204 may include a retraction mechanism 212 operable to move the tip between an advanced position, where the tip protrudes from the pen housing to allow deposition of writing material on a surface, and a retracted position, where the tip is disposed within the pen housing. A sensor 214 may be used to detect whether the tip is in the advanced or retracted position. A view through the cross-section 3-3 is shown in FIG. 3.

FIG. 3 is a sectional view of an exemplary active pen refill cartridge 202. The active pen refill cartridge 202 comprises a hollow body 302 configured to contain ink 304. The ink 304 is supplied to ball-point assembly 210 to enable writing on paper. A circuit assembly 306 is operable to transmit a stylus signal to the ball-point assembly 210 to enable electronic drawing or writing. The stylus signal may be transmitted via a wire, via the hollow body 302, or via a surface coating on the hollow body 302. In this embodiment, the circuit assembly 306 is powered by battery 308. The battery 308 may be electrically coupled to the circuit assembly 306 via one or more electrical connections 310. In one embodiment, the hollow body 302, or a coating on the hollow body, is electrically conductive and may be used to couple one pole of the battery, such as the ground, to the circuit assembly. The battery 308 may be located in a battery compartment 316 at the end of the hollow body 302 to facilitate easy replacement of the battery 308. A terminal or contact pad 318 may be used to couple the battery to the circuit assembly 306.

In one embodiment, the circuit assembly 306 is immersed in the ink 304. This configuration maximizes the amount of ink contained in the cartridge.

The battery may be coupled to the circuit assembly via a switch. The switch may be, for example, included in a force sensing mechanism 312. In this embodiment, the force sensing mechanism 312 is mechanically coupled to the ball-point assembly 210 via shaft 314. The shaft may be electrically conductive and used to provide an electrical coupling between the circuit assembly 306 and the ball-point assembly 210. A compliant element 320 reduces the mechanical coupling between the ball-point assembly 210 and the end of the hollow body 302, so that a force applied to the ball-point assembly 210 is transferred to the force activated switch 312 via shaft 314. Additionally, the element 320 may be an electrical insulator that prevents the stylus signal, supplied to the ball-point assembly 210, from being electrically coupled to the hollow body 302. This enables hollow body 302 to be used as power supply conductor. For example, the hollow body 302 may be coupled to a battery and used as an electrical ground or supply voltage.

In some embodiments, the force-sensing mechanism 312 further comprises a sensor configured to sense forces applied to the ball-point assembly 210. When used as an active stylus, the circuit assembly is operable to generate a stylus signal that is descriptive of the force applied to the ball-point assembly 210. The force signal may be utilized by a host electronic device to control selected features of a drawing or writing application executed on the host electronic device.

Figure 4:
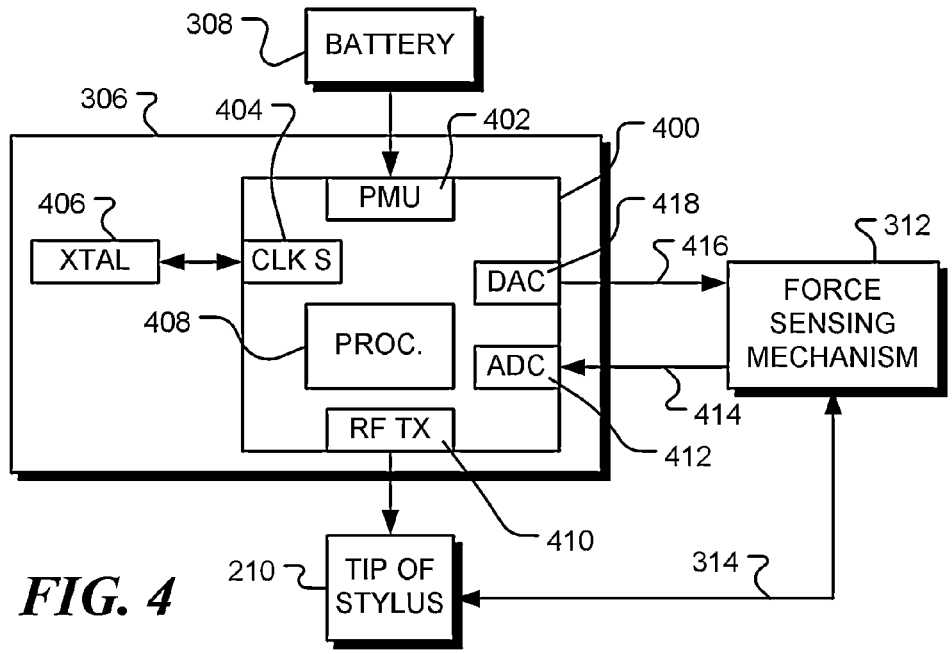
FIG. 4 is a block diagram of an exemplary circuit assembly for an active stylus in accordance with an aspect of the disclosure.

FIG. 4 is a block diagram of an exemplary circuit assembly of an active stylus. The circuit assembly 306 includes a control module 400, which may be a micro-controller, a system on a chip (SoC), an assembly of discrete components, an assembly of integrated circuits or a combination thereof, for example. The control module 400 includes power management unit (PMU) 402, which receives power from an external power supply, such as battery 308, and a clock system (CLK S) 404 that receives a timing signal from a crystal (XTAL) 406. The clock system is utilized, for example, to supply an instruction clock to processing core 408. The clock system 404 may also supply a timing signal to a radio transmitter 410. The radio transmitter 410 supplies a radio signal to the ball-point assembly 210. The ball-point assembly 210 operates as an antenna to transmit the radio signal to a host electronic device. The control module 400 also includes an analog-to-digital converter 412, operable to sample a force signal 414 from force-sensing mechanism 312. The force signal 414 is representative of a force applied to the ball point assembly 210, which is mechanically coupled to the force sensing mechanism via coupling 314. The force-sensing mechanism 312 may also receive a signal 416 from the control module 400 via digital-to-analog converter 418.

In the embodiment shown in FIG. 4, an analog-to-digital converter 412 is used to provide a digital representation of the force signal. The digital representation may comprise one or more bits. For example, an 8-bit converter might be used. When a single bit is used to indicate whether the force signal is above or below a threshold value, the analog-to-digital converter 412 may be replaced by a switch.

The power management unit 402 may incorporate a battery monitor. An indicator of the battery level may be embedded in the stylus signal and communicated to a host electronic device. The host electronic device can then display the battery level to a user, via the display screen, to facilitate timely battery replacement.

A further aspect of the disclosure relates to a writing implement comprising a pen refill cartridge and an active stylus cartridge that are constructed and arranged to fit together within a pen housing. The pen refill cartridge has a hollow body, adapted to contain ink, and a ball-point assembly configured to receive ink from within the hollow body and further configured to receive a stylus signal. A terminal at one end of the cartridge enables a stylus signal from the active stylus cartridge to be electrically coupled to the ball-point assembly. The active stylus cartridge includes a circuit assembly operable to produce a stylus signal, and a terminal is located at one end of the cartridge enables the stylus signal to be electrically coupled to the pen refill cartridge.

FIG. 5 is a sectional view of an exemplary active pen refill cartridge 202, in accordance with an aspect of the disclosure. The active pen refill cartridge 202 is arranged in two-parts, comprising a signal generation cartridge 502 and antenna/ink cartridge 504. This embodiment facilitates replacement of the ink cartridge 504 without having to replace the signal generation cartridge 502.

The antenna/ink cartridge 504 comprises a hollow body 302' configured to contain ink 304. The ink 304 is supplied to ball-point assembly 210 to enable writing on paper. Electrical conductor 506 couples a stylus signal from terminal 508 to the ball-point assembly 210. The stylus signal may be transmitted via a wire, via the hollow body 302', or via a surface coating on the hollow body 302'.

The signal generation cartridge 502 comprises a body 302" that houses circuit assembly 306. The circuit assembly 306 is operable to transmit a stylus signal to antenna/ink cartridge 504 via terminal 510, which aligns with electrical coupling 508 of antenna/ink cartridge 504 when the cartridges are aligned within a pen housing. The circuit assembly 306 is powered by battery 308. In operation, signal generation cartridge 502 and antenna/ink cartridge 504 are aligned in series inside a pen housing, such that a force applied to the ball-point assembly 210 pushes stop element 512 against an interior surface of the pen housing and produces a force across force-sensing mechanism 312. The force-sensing mechanism 312 may include a force-activated switch and/or a force sensor operable to sense the force applied to the ball-point assembly 210. The force activated switch may be used to switch power to the circuit assembly 306. If no force is applied for a set period of time, the circuit assembly is de-powered. This enables the active stylus to be used in a 'hover' mode, in which the ball-point assembly is close to, but not touching, a display screen of an electronic device. When used as an active stylus, the circuit assembly is operable to generate a stylus signal that is descriptive of the force applied to the ball-point assembly 210, as sensed by the force-sensor of the force-sensing mechanism 312. The force signal may be utilized by a host electronic device to control selected features of a drawing or writing application executed on the host electronic device.

The battery 308 may be placed in series with the force sensor, so that forces are coupled to the sensor through the battery, or the battery may be placed at other locations in the hollow body 302". The battery and housing therefor may be configured to enable easy replacement of the battery.

A stylus identifier may be embedded within the stylus signal and transmitted to a host device. The identifier may be type identifier and/or a unique identifier the stylus.

FIG. 6 is a sectional view of an active an exemplary pen active refill cartridge 202 in accordance with an aspect of the disclosure. The active pen refill cartridge 202 comprises signal generation cartridge 502 and antenna/ink cartridge 504. This embodiment allows the antenna/ink cartridge 504 to be replaced without having to replace the signal generation cartridge 502, and allows the battery to be replaced at the same time.

The antenna/ink cartridge 504 comprises hollow body 302' configured to contain ink 304. The ink 304 is supplied to ball-point assembly 210 to enable writing on paper. Electrical conductor 506 couples a stylus signal from terminal 508 to the ball-point assembly 210. The stylus signal may be transmitted via a wire, via the hollow body 302', or via a surface coating on the hollow body 302'. Battery 308 is electrically coupled to one or more terminals 602 to enable power to be supplied to the signal generation cartridge 502.

The signal generation cartridge 502 comprises body 302" that houses circuit assembly 306. The circuit assembly 306 is operable to transmit a stylus signal to antenna/ink cartridge 504 via terminal 510, which aligns with electrical coupling 508 of antenna/ink cartridge 504. In operation, signal generation cartridge 502 and antenna/ink cartridge 504 are aligned in series inside a pen housing, such that a force applied to the ball-point assembly 210 pushes force-sensing mechanism 312 against an interior surface of the pen housing. The force-sensing mechanism 312 may include a force-activated switch and/or a force sensor operable to sense the force applied to the ball-point assembly 210. The force activated switch may be used to switch power to the circuit assembly 306. In this embodiment, the circuit assembly 306 is powered by battery 308 that is electrically coupled to the circuit assembly, through the force activated switch, when the one or more terminals 604 make contact with the mating terminals 602. If no force is applied for a set period of time, the circuit assembly is de-powered. This enables the active stylus to be used in a 'hover' mode, in which the ball-point assembly is close to, but not touching, a display screen of an electronic device. When used as an active stylus, the circuit assembly is operable to generate a stylus signal that is descriptive of the force applied to the ball-point assembly 210, as sensed by the force-sensor of the force-sensing mechanism 312. The force signal may be utilized by a host electronic device to control selected features of a drawing or writing application executed on the host electronic device.

FIG. 7 shows an exemplary two-part active pen refill cartridge in accordance with an aspect of the disclosure. The active pen refill cartridge comprises signal generation cartridge 502 and antenna/ink cartridge 504. The cartridges are shown positioned within the body of pen 102. The cartridges are electrically coupled through terminal 510 of signal generation cartridge 502 and terminal 508 of antenna/ink cartridge 504, enabling a stylus signal generated in signal generation cartridge 502 to be coupled to the antenna of antenna/ink cartridge 504. Additional electrical connections may be used if the battery is located in antenna/ink cartridge 504. A bias element 702 (such as a spring) holds the cartridges in the correct position and relieves force on the force-activated switch 512 when no force is applied to the ball-point assembly 210. In use, a force applied to ball-point assembly 210 is transferred to cartridge 502 and compresses bias element 702. This activates force-activated switch 512 to power the signal generation cartridge 502. Signal generation cartridge 502 may remain powered for a period of time after the force is removed from ball-point assembly 210.

In one embodiment, the signal generation cartridge 502 is provided with an on/off switch that may be activated by user when the cartridge is removed from the pen body 102. This enables battery power to be conserved when writing on paper.

In another embodiment, the signal generation cartridge 502 may be powered on or off by tapping the ball-point assembly on a surface a set number of times within a period of time. Again, this enables battery power to be conserved when writing on paper.

In a further embodiment, the signal generation cartridge 502 is permanently powered.

Figure 8:
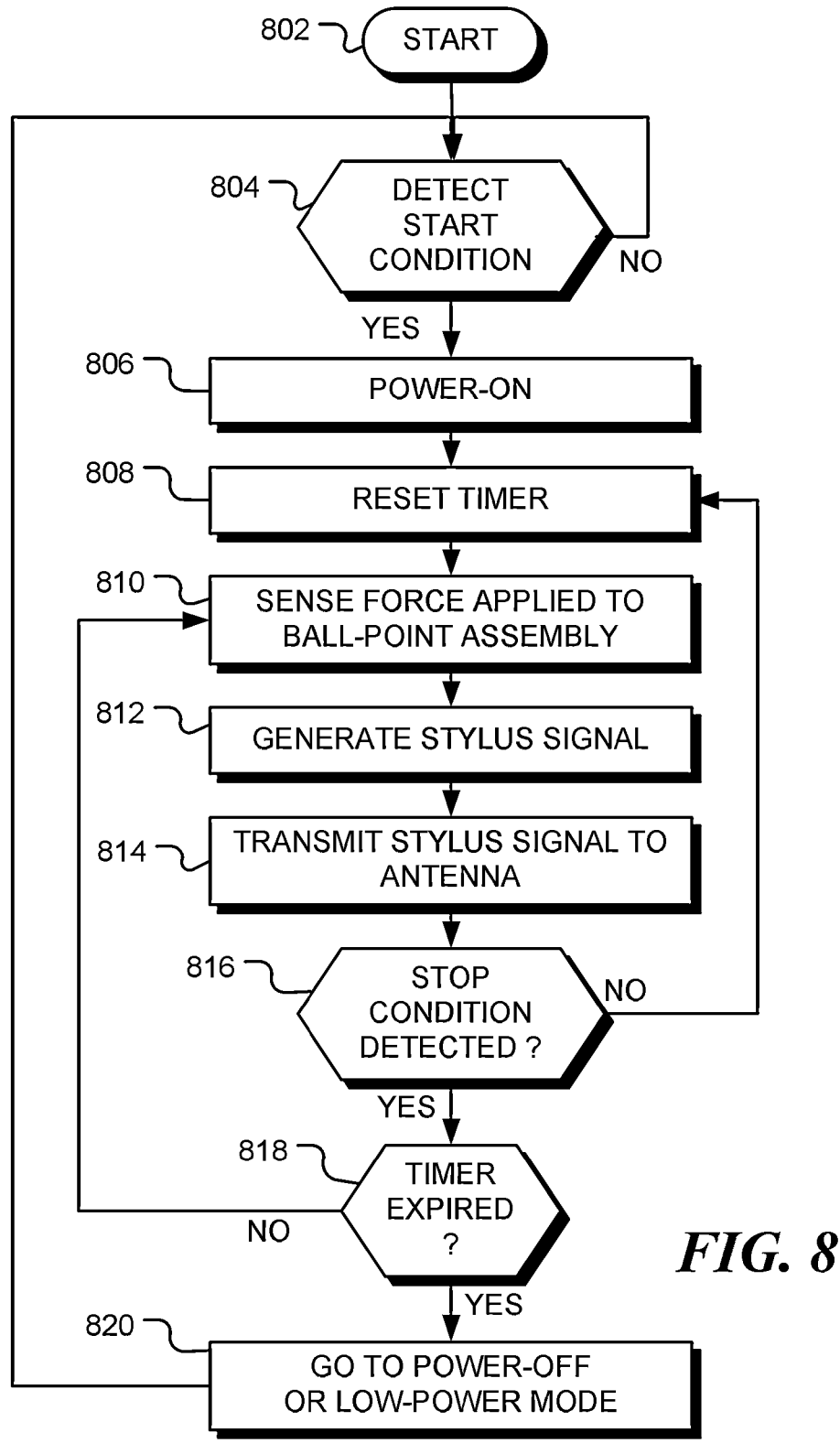
FIG. 8 is a flow chart of a method of operation for an active refill cartridge in accordance with an aspect of the disclosure.

FIG. 8 is a flow chart 800 of a method of operation of a combination active stylus and ball-point pen. At start block 802, the circuit assembly is powered-off or in a low power mode, so as to conserve battery life. Following start block 802, a start condition is detected at decision block 804. The start condition may be, for example, a user-activated switch, a force-activated switch, or tapping of the ball-point assembly on a surface. At block 806, the circuit assembly is powered to enable full operation. If the start condition is caused by a force activated switch, a timer is reset at block 808. The timer allows the circuit assembly to remain powered for a period of time after a start condition is detected. Optionally, at block 810, the force applied to the ball-point assembly is sensed, using the force-sensing mechanism, and at block 812 a stylus signal is generated. The stylus signal, which may be representative of the force applied to the ball-point assembly, is transmitted to the antenna at block 814. At decision block 816, a stop condition is detected. The stop condition may be, for example, a user-activated switch, an absence of force on a force-activated switch, or tapping of the ball-point assembly on a surface. If a stop condition is not detected, as depicted by the negative branch from decision block 816, flow returns to block 808 and the timer is reset. If the stop condition is caused by a force activated switch, a check is made at decision block 818 to determine if the timer has expired. If the timer has expired, as depicted by the positive branch from decision block 818, the circuit assembly is de-powered or enters a low power operating mode at block 820. Similarly, if the stop condition is the result of a user-activated switch or tapping of the ball-point assembly on a surface, the timer expiration period may be set to zero so that flow continues to block 820 when the stop condition is detected.

Figure 9:
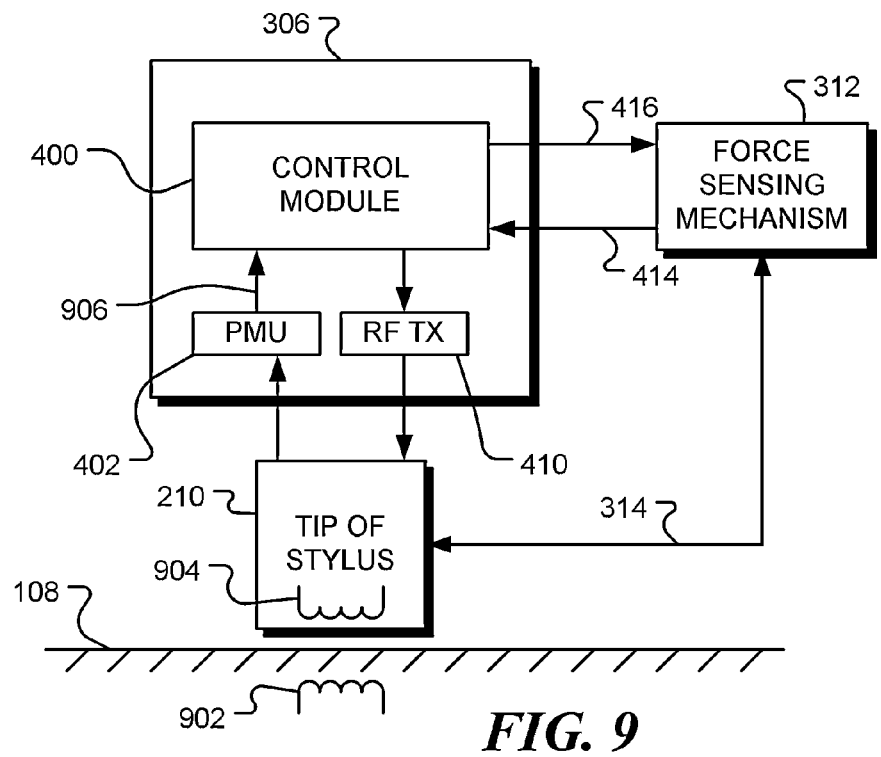
FIG. 9 is a block diagram of an active stylus in accordance with an aspect of the disclosure.

FIG. 9 is a block diagram of an exemplary active stylus. The circuit assembly 306 includes a control module 400, which may be a micro-controller, a system on a chip (SoC), an assembly of discrete components, an assembly of integrated circuits or a combination thereof, for example. In this embodiment, the stylus communicates with a host electronic device using near field communication (NFC) and the control module 400 is powered from a remote power source. The remote power source comprises a plurality of inductors 902 close to the surface of the display screen 108 of a host electronic device. In operation, when stylus tip 210 is positioned close to the inductor 902 of the host, the electromagnetic field produced by the inductor 902 of the host induces a current in an inductor 904 in the tip of the stylus. The induced current is supplied to power management unit (PMU) 402 to produce power supply 906 for the control module 400. The radio transmitter 410 supplies a radio signal to the ball-point assembly 210. This may be used to modify a property of the inductor 904 (such as the inductance, resistance, current etc) that may be sensed by the host electronic device.

In this embodiment, the stylus position is only detected when the stylus tip is close to display screen 108 of a host electronic device. The stylus is inactive otherwise. By placing a sheet of paper over the display screen 108, a user may simultaneously create a drawing on the paper and on the electronic device.

FIG. 10 is a sectional view of an illustrative two-part active pen refill cartridge 202 in accordance with an aspect of the disclosure. In this embodiment, the pen refill cartridge 504 incorporates an ink level sensor comprising a first probe 1002 electrically coupled to a first terminal 1004, and a second probe 1006 electrically coupled to a terminal 1008. Ink 304 is electrically conductive and completes a circuit between the first and second probes. The resistance of the circuit is dependent upon the amount of ink in the cartridge—a full cartridge will have a lower resistance than an empty or partially empty cartridge. In operation, the first and second probes (1002, 1006) are coupled to signal generation cartridge 502, via terminal 1010 and 1012, which in turn is operable to sense the resistance between the two probes. A signal indicative of the ink level may be embedded in the stylus signal and transmitted to a host electrical device via the ball-point assembly 210.

Figure 11:
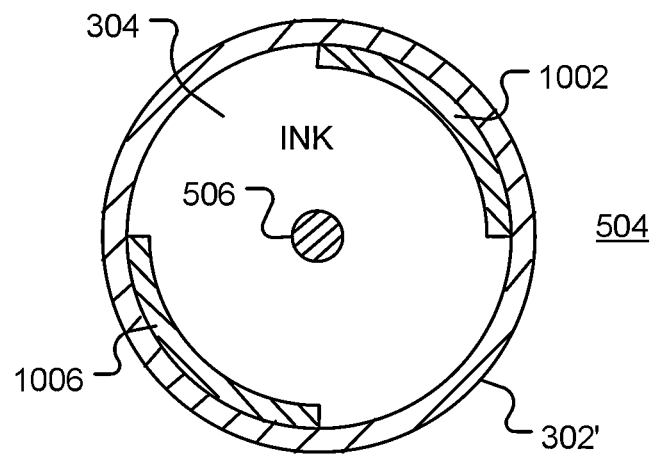
FIG. 11 is a sectional view of a pen refill cartridge in accordance with an aspect of the disclosure.

FIG. 11 is a sectional view through at lines 11-11 shown in FIG. 10. Ink 304 is contained within the hollow body 302' and forms an electrical connection between first probe 1002 and second probe 1004. The first and second probes may be implemented as coatings or traces on the non-conducting interior of the hollow body 302'. The width of the probes, or the spacing between the probes, may be varied in different implementations and may be selected dependent upon the electrical properties of the ink and/or the probes. For example, wider probe spacing may be used for a more conductive ink. Once the resistance between the probes is determined, the information may be embedded in a stylus signal transmitted along insulated conductor 506 to the ball point assembly.

In a further embodiment, conductor 506 is not insulated, and the ink level is determined by measuring the resistance between the conductor 506 and a single probe.

In a yet another exemplary embodiment as shown in FIG. 12, the pen refill cartridge 504 incorporates a sensor for determining when the ink level is low. In this embodiment, a first probe 1202 located in the hollow body 302' is electrically coupled via insulated conductor 1204 to a first terminal 1206 and a second probe 1208 is electrically coupled via insulated conductor 1210 to a second terminal 1212. Conductive ink 304 provides an electrical connection between the first and second probes when the ink level is above the level of the probes. However, no connection is provided when the ink level is below the level of the probes. The absence of a connection indicates that the ink level is low, and this information may be communicated to a host electronic device via the stylus signal. The first and second probes may be spaced apart in the longitudinal or circumferential directions of the hollow body 302' and may be any shape. For example, longitudinally spaced rings, or circumferentially spaced pads may be used.

Figure 13:
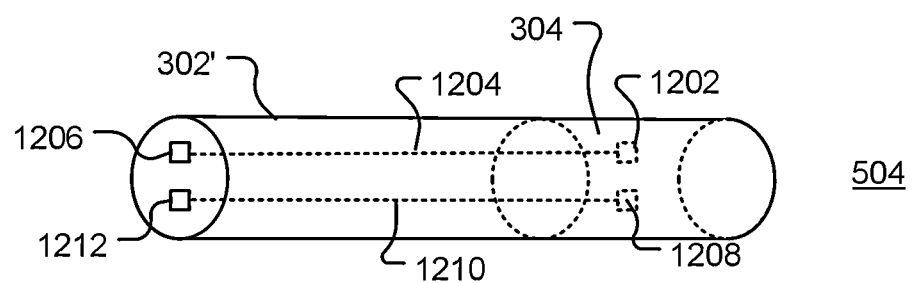
FIG. 13 is a further schematic diagram of a pen refill cartridge including an ink level sensor in accordance with an aspect of the disclosure.

FIG. 13 is a further view of a pen refill cartridge 504 incorporating a sensor for determining when the ink level is low. In this embodiment, a first probe 1202 located in the hollow body 302' is electrically coupled via insulated conductor 1204 to a first terminal 1206 and a second probe 1208 is electrically coupled via insulated conductor 1210 to a second terminal 1212. Conductive ink 304 provides an electrical connection between the first and second probes when the ink level is above the level of the probes. However, no connection is provided when the ink level is below the level of the probes. The absence of a connection indicates that the ink level is low, and this information may be communicated to a host electronic device via the stylus signal. The first and second probes may be spaced apart in the longitudinal or circumferential directions of the hollow body 302' and may be any shape. Circumferentially spaced pads are used in the exemplary embodiment shown.

The implementations of the disclosure described above are intended to be merely exemplary. It will be appreciated by those of skill in the art that alterations, modifications and variations to the illustrative embodiments disclosed herein may be made without departing from the scope of the disclosure. Moreover, selected features from one or more of the above-described embodiments may be combined to create alternative embodiments not explicitly shown and described herein.

The disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An apparatus for inputting information to a host electronic device and writing on physical media, comprising:
   an assembly including at least one element configured to generate radio signals for transmission to the host electronic device;
   a tip configured to deposit a writing material on the physical media and connected to the assembly to transmit the generated radio signals to the host electronic device; and
   an electrically conductive shield for at least partially shielding transmission of the radio signals along the cartridge and enhancing transmission of the radio signals from the tip, wherein the tip further comprises a ball-point assembly and the at least one element comprises a transmitter configured for generating the radio signals, and wherein the apparatus further comprises a housing and a replaceable cartridge within the housing, and wherein the replaceable cartridge includes the ball-point assembly and the transmitter.

2. The apparatus of claim 1, wherein the housing comprises an electrically conductive coating that electrically couples the at least one element to the ball-point assembly.

3. The apparatus of claim 1, wherein the ball-point assembly comprises a wire electrically coupling the at least one element to the ball-point assembly.

4. The apparatus of claim 1, further comprising:
a sensor configured to sense a force applied to the ball-point assembly and produce a force signal,
wherein the radio signals includes a signal representative of the force applied to the ball-point assembly and are generated by the at least one element for transmission to the host electronic device.

5. The apparatus of claim 4, further comprising:
a compliant element configured to deform when a force is applied to the ball-point assembly to allow displacement of the ball-point assembly,
the sensor comprising a displaceable element configured to sense displacement of the ball-point assembly relative to the housing.

6. The apparatus of claim 4, wherein the sensor comprises at least one of:
a piezo-electric sensor;
a piezo-resistive sensor;
an optical sensor;
a capacitive sensor; and
a resistive sensor.

7. The apparatus of claim 6, further comprising:
a compliant element disposed between the ball-point assembly and the housing, the compliant element adapted to reduce mechanical coupling between the ball-point assembly and the housing.

8. The apparatus of claim 7, wherein the sensor is coupled to the housing, the apparatus further comprising:
a shaft connecting the ball-point assembly to the sensor.

9. The apparatus of claim 1, wherein the tip comprises a light emitting diode for generating an optical stylus signal.

10. The apparatus of claim 1, wherein the tip comprises an ultrasonic transducer for generating an ultrasonic stylus signal.

11. An apparatus for inputting information to a host electronic device and writing on physical media, comprising:
an assembly including at least one element configured to generate radio signals for transmission to the host electronic device; and
a tip configured to deposit a writing material on the physical media and connected to the assembly to transmit the generated radio signals to the host electronic device,
wherein the at least one element comprises:
a circuit assembly; and
a power source; and
wherein the circuit assembly further comprises a processor, and wherein the processor is configured to switch from a low-power state to an operable state responsive to the force applied to the tip.

12. The apparatus of claim 11, wherein the at least one element further comprises a switch configured to couple the power source to the circuit assembly when a force is applied to the tip.

13. An apparatus for inputting information to a host electronic device and writing on physical media, comprising:
an assembly including at least one element configured to generate radio signals for transmission to the host electronic device;
a tip configured to deposit a writing material on the physical media and connected to the assembly to transmit the generated radio signals to the host electronic device;
a pen refill cartridge comprising a hollow body, and wherein the at least one element is disposed at least partially within the hollow body; and
an electrically conductive shield for at least partially shielding transmission of the radio signals along the cartridge and enhancing transmission of the radio signals from the tip.

14. The apparatus of claim 13, wherein the tip further comprises a ball-point assembly and the at least one element comprises a transmitter configured for generating the radio signals.

15. The apparatus of claim 13, wherein the at least one element comprises:
a circuit assembly; and
a power source.

16. The apparatus of claim 13, further comprising:
a pen housing constructed and arranged to hold the pen refill cartridge and the at least one element.

17. The apparatus of claim 16, wherein the pen housing comprises a retraction mechanism operable to move the tip between an advanced position wherein the tip protrudes from the pen housing to allow deposition of writing material on a surface and a retracted position wherein the tip is disposed within the pen housing.

18. The apparatus of claim 17, further comprising a sensor configured to sense for sensing whether the tip is in the advanced position or the retracted position.

19. An apparatus for inputting information to a host electronic device and writing on physical media, comprising:
an assembly including at least one element configured to generate radio signals for transmission to the host electronic device; and
a tip configured to deposit a writing material on the physical media and connected to the assembly to transmit the generated radio signals to the host electronic device,
the apparatus further comprising a pen refill cartridge including
a hollow body having a reservoir;
ink disposed within the reservoir; and
first and second probes adapted to contact the ink, such that an electrical resistance between the first and second probes is dependent upon a level of ink contained within the reservoir,
wherein the at least one element is configured to monitor the electrical resistance between the first and second probes, and
wherein the signals transmitted to the host electronic device are dependent upon the electrical resistance between the first and second probes.

20. The apparatus of claim 19, wherein the first and second probes extend substantially the length of the hollow body.

21. The apparatus of claim 20, wherein the second probe couples the signals to the tip.

22. The apparatus of claim 19, wherein the first and second probes are disposed in the hollow body proximal to the tip.

* * * * *